| (12) | United States Patent | (10) Patent No.: | US 9,011,126 B2 |
|---|---|---|---|
| | Grassi | (45) Date of Patent: | Apr. 21, 2015 |

(54) MACHINE FOR CONTINUOUS CASTING OF PRE-MORTARED MASONRY PANELS

(71) Applicant: Theresa Grassi, Grosse Pointe Woods, MI (US)

(72) Inventor: Frank Grassi, Grosse Pointe Woods, MI (US)

(73) Assignees: Frank Grassi, Grosse Pointe Woods, MI (US); Teresa Grassi, Grosse Pointe Woods, MI (US)

( * ) Notice: Subject to any disclaimer, the term of this patent is extended or adjusted under 35 U.S.C. 154(b) by 18 days.

(21) Appl. No.: 13/944,506

(22) Filed: Jul. 17, 2013

(65) Prior Publication Data

US 2014/0023741 A1 Jan. 23, 2014

Related U.S. Application Data

(60) Provisional application No. 61/672,466, filed on Jul. 17, 2012.

(51) Int. Cl.
| *B28B 1/00* | (2006.01) |
|---|---|
| *B29D 99/00* | (2010.01) |
| *E04B 2/00* | (2006.01) |
| *B29C 67/24* | (2006.01) |
| *B29C 41/28* | (2006.01) |
| *B29C 41/30* | (2006.01) |

(52) U.S. Cl.
CPC ................ *B29D 99/001* (2013.01); *E04B 2/00* (2013.01); *B29C 41/28* (2013.01); *B29C 41/30* (2013.01); *B29C 67/245* (2013.01)

(58) Field of Classification Search
CPC ........ B28B 1/00; B29D 99/001; B29D 99/00; B01F 5/0473; B01F 7/00708; B01F 7/086; B01F 15/0251; B01F 15/003; B01F 15/002
USPC ................ 425/115; 366/150.1, 183.1, 20, 26; 52/315
See application file for complete search history.

(56) References Cited

U.S. PATENT DOCUMENTS

| 2,130,911 | A | * | 9/1938 | Teunon ........................... 52/315 |
| 3,335,048 | A | | 8/1967 | Morain | |
| 3,350,827 | A | * | 11/1967 | Sugar ........................... 52/309.3 |

(Continued)

FOREIGN PATENT DOCUMENTS

DE 2717377 A1 10/1978

OTHER PUBLICATIONS

English language abstract and machine-assisted translation for DE2717377 (A1), extracted from the espace.ent.com database on Oct. 1, 2013.

(Continued)

*Primary Examiner* — Jacob Thomas Minskey
(74) *Attorney, Agent, or Firm* — Howard & Howard Attorneys PLLC (57) ABSTRACT

A machine for continuous casting of pre-mortared masonry panels includes a rotatable continuous mold for continuously forming pre-mortared masonry panels and an application system for applying polymeric material to the continuous mold as the continuous mold rotates. The machine also includes a brick setter system for setting bricks onto the polymeric material as the continuous mold rotates. The machine further includes a cutting device for cutting the bricks and polymeric material into panels to form the pre-mortared masonry panels.

20 Claims, 9 Drawing Sheets

(56) References Cited

U.S. PATENT DOCUMENTS 3,521,418 A 7/1970 Bartoloni
4,590,726 A 5/1986 Salazar
4,644,719 A 2/1987 Salazar
5,526,630 A 6/1996 Francis et al.

OTHER PUBLICATIONS

U.S. Appl. No. 07/497,405, filed Mar. 22, 1990, which is a continuation of U.S. Appl. No. 07/204,222.

* cited by examiner

MACHINE FOR CONTINUOUS CASTING OF PRE-MORTARED MASONRY PANELS

CROSS-REFERENCE TO RELATED APPLICATION(S)

The present application claims the priority date of U.S. Provisional Patent Application Ser. No. 61/672,466, filed Jul. 17, 2012.

BACKGROUND OF THE INVENTION

1. Field of the Invention

The present invention relates generally to pre-mortared masonry panels and, more particularly, to a machine for continuous casting of pre-mortared masonry panels.

2. Description of the Related Art

Bricks are the oldest man made building material of early civilization. The method of making bricks has improved, but the installation is still done "one brick at a time" as it was 5,000 years ago. This basic inefficiency has inspired the making of many other materials and systems that are more efficient to make and install. However, the look and beauty of brick material continues to be the most desirable, thus the need to make the installation of brick materials more efficient. The 20$^{th}$ Century saw many of these innovations. One of these is the use of structural steel that made construction of skyscrapers possible. Before structural steel, brick was the structural element that supported other building elements. Brick and stone used in conventional construction are now classified as "skin" elements. Light gage steel backup further eliminated the need for structural brick and thus 4" brick is classified as a "brick veneer". This innovation comes with many problems. The brick has only a bed width of 4" and is tied back to the structural framing with an air cavity between it and the backup substrate. Structural wind loads rely on ties made of thin 9 Gage galvanized wire and treaded screws. These light gage components will eventually rust and much of what has been constructed will fail and have to be repaired or replaced, thus the need to improve on the common art.

There are other thin brick panel systems that are marketed as labor saving brick panels but require trained skilled personnel. Some of these systems, first made in the 1940's are similar to U.S. Pat. No. 5,526,630 to Francis et al. that describes a method of producing a thin brick panel assembly on rigid foam insulation. For this panel assembly, skilled workers are needed to install a backup liner, attach each brick by hand, and fill all the brick joints using a grout bag. Each of the grouted joints then need to be tooled (formed in a concave profile) and the panels cleaned. This labor intensive method make this type of brick panel non-competitive except in special renovations where the brick look is desired but conventional brick masonry is not an option. They are not sold to the residential market because conventional 4" brick veneer can cost less. These assemblies rely on an anchor that is integral with the thin amount of mortar surrounding it. The joint material dries too quickly and tends to crack. Failure is inherent in its construction. Thus, there is a need to make a panel that is pre-mortared using polymeric grout in the joints, filling the space between bricks, and forming a backup substrate that adds strength to the thin brick panels.

U.S. Pat. No. 4,644,719 Salazar discloses a decorative wall panel in which bricks are placed face down at the bottom of a mold and cement mixture is hand placed on the back side of the bricks forming a backing, but still requires cleaning of the excess mortar on the brick face. In addition the Salazar '719 patent discloses the use of Portland cement, sand, and pigmented binder and not a fast curing polymer concrete. U.S. Pat. No. 3,335,048 to Morain discloses a mosaic tile assembly having a tiled plate and not pre-mortared masonry panels. U.S. Pat. No. 3,521,418 to Batoloni discloses a pre-finished decorative rigid panel that requires a joint grouting step and does not teach the polymeric cementatious material. U.S. Pat. No. 3,350,827 to Sugar discloses a building panel and not pre-mortared masonry panels. The German Patent No. 27-17-377 to Meirich discloses a composite pre-molded facing for a building wall with plastic hand poured into a molding tray and a plastic panel and not a pre-mortared masonry panel.

Therefore, the "in place cost" of brick is the most important factor that differentiates "one brick at a time" methods to any other brick panel system. Thus, it is desirable to automate brick panel production so as to lower the cost of the installation. It is also desirable to continuously cast pre-mortared masonry panels. Thus, there is a need in the art to provide a machine that meets at least one of these desires.

SUMMARY OF THE INVENTION

It is, therefore, one object of the present invention to reduce cost of in place brick, thus making it more affordable.

It is another object of the present invention to mass produce thin brick panels.

It is yet another object to produce brick panel products of high quality made from materials that have proven record of durability.

To achieve one or more of the foregoing objects, the present invention is a machine for continuous casting of pre-mortared masonry panels. The machine includes a rotatable continuous mold for continuously forming pre-mortared masonry panels and an application system for applying polymeric material to the continuous mold as the continuous mold rotates. The machine also includes a brick setter system for setting bricks onto the polymeric material as the continuous mold rotates. The machine further includes a cutting device for cutting the bricks and polymeric material into panels to form the pre-mortared masonry panels.

One advantage of the present invention is that a machine is provided for continuous casting of pre-mortared masonry panels. Another advantage of the present invention is that the machine allows the panel to be pre-mortared, eliminating the labor needed to tuck-point all joints or clean excess mortar. Yet another advantage of the present invention is that the machine forms the panel in a modular size typically 1'-4" wide, allowing for a variety of panel lengths and patterns and other modular sized masonry units. Still another advantage of the present invention is that the machine allows all of these products to be made as a panelized system on the same mass production machinery. A further advantage of the present invention is that the machine provides an automated method of manufacture of pre-mortared masonry panels.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
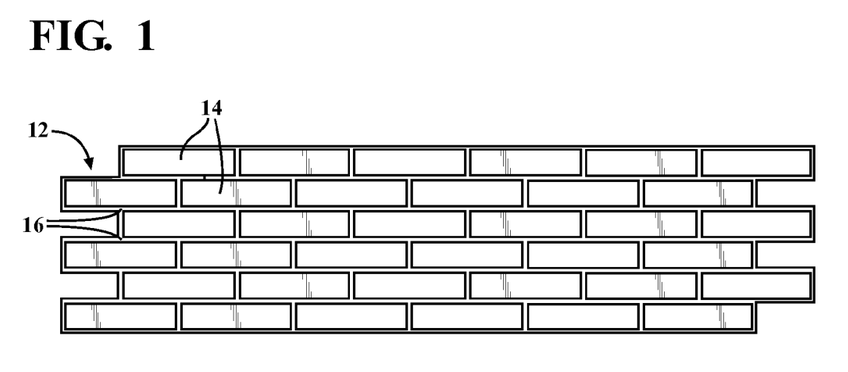
FIG. 1 is a front view of a modular pre-mortared masonry panel including polymer concrete and thin bricks formed by a machine, according to the present invention.
Figure 1A:
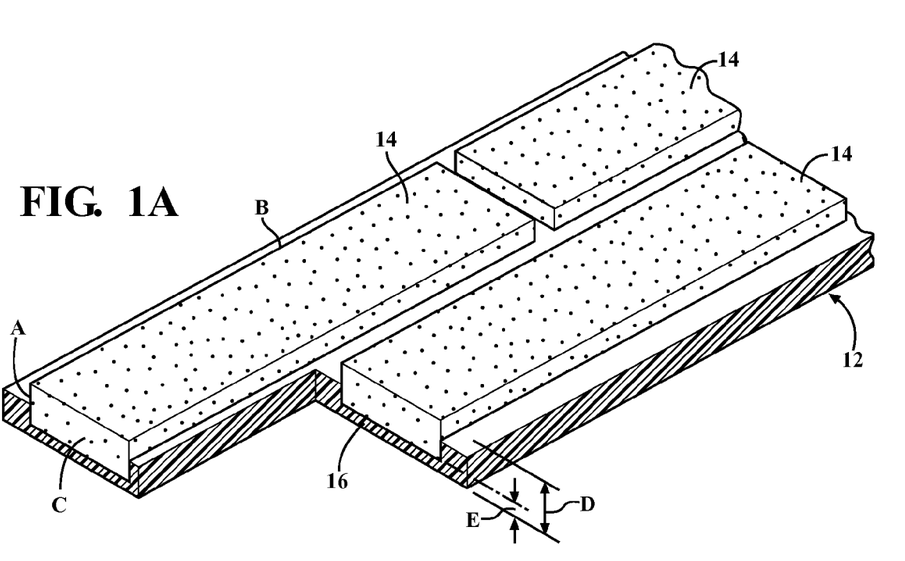
FIG. 1A is a perspective view of a portion of the pre-mortared masonry panel of FIG. 1.
Figure 1B:
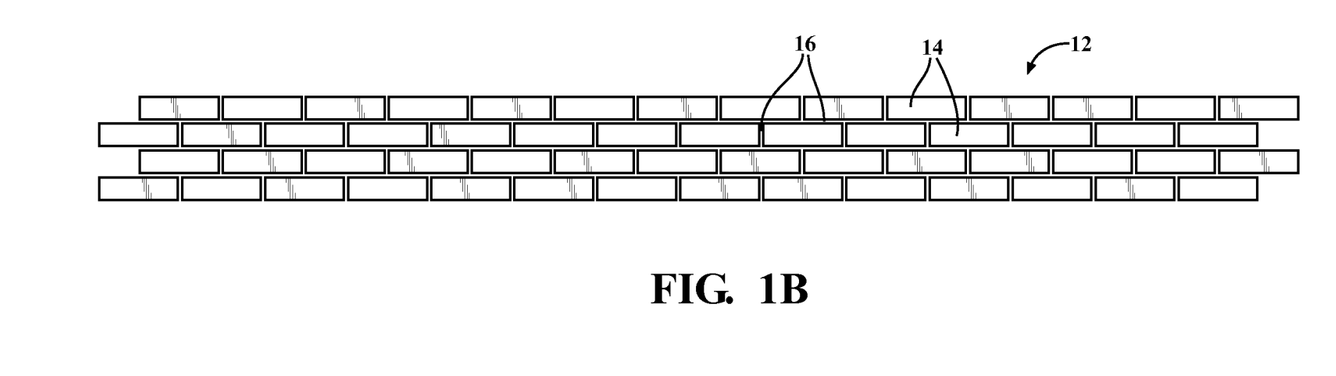
FIG. 1B is a front view of another embodiment of a modular pre-mortared masonry panel including polymer concrete and thin bricks formed by a machine, according to the present invention.
Figure 1C:
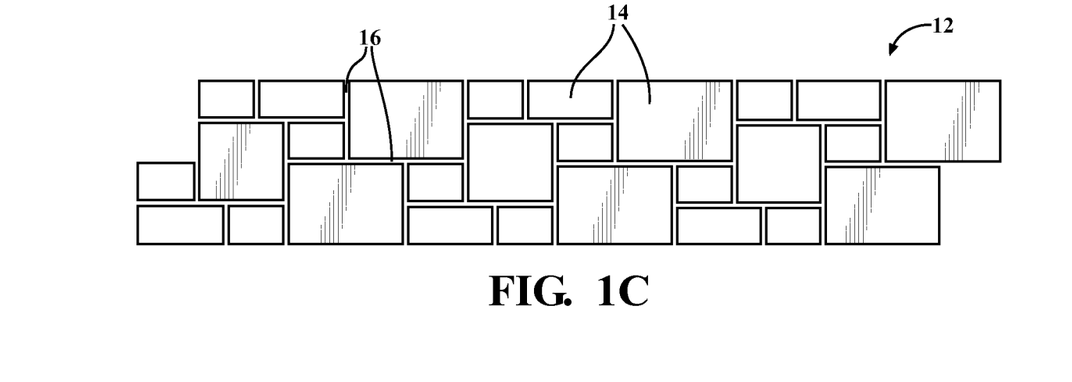
FIG. 1C is a front view of yet another embodiment of a modular pre-mortared masonry panel including polymer concrete and thin bricks formed by a machine, according to the present invention.
Figure 2:
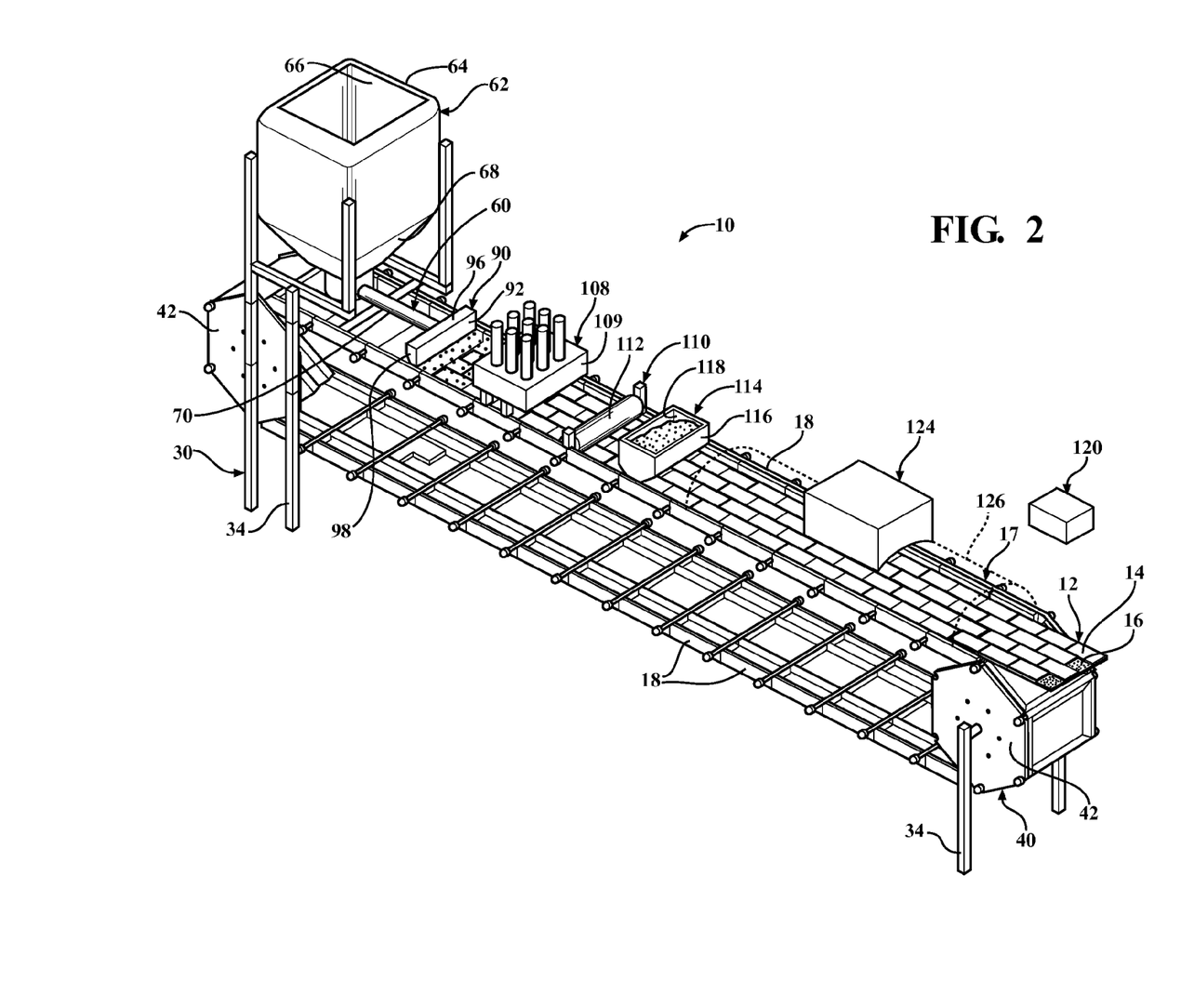
FIG. 2 is a perspective view of a machine, according to one embodiment of the present invention, for continuous casting of the pre-mortared masonry panels of FIG. 1.
Figure 3:
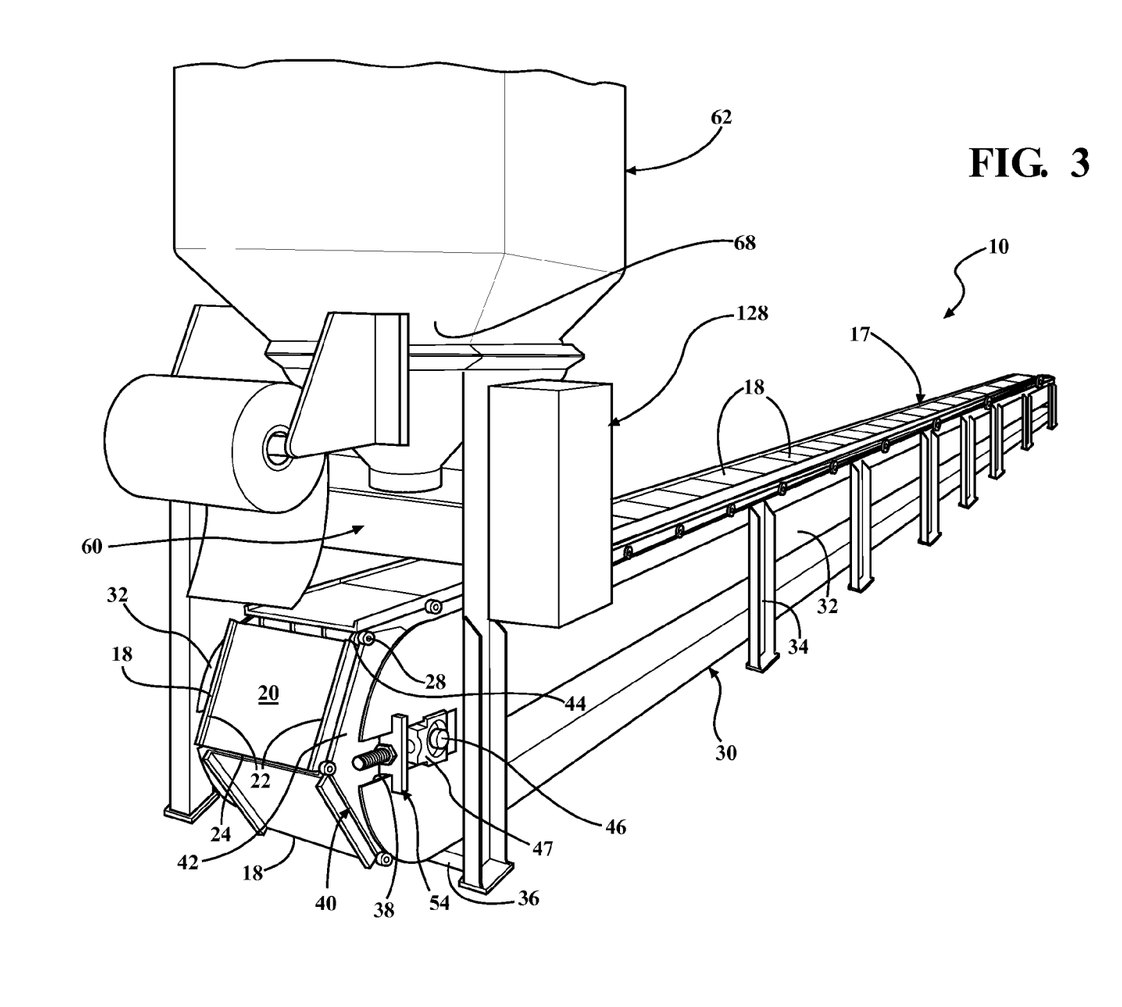
FIG. 3 is another perspective view of the machine, according to one embodiment of the present invention, of FIG. 2 with some components removed.

Referring now to the drawings, and in particular FIGS. 2 and 3, one embodiment of a machine 10, according to the present invention, is shown for continuously forming or casting pre-mortared masonry panels, generally indicated at 12, in FIG. 1. As illustrated in FIGS. 1 and 1A, a pre-mortared masonry panel, generally indicated at 12, is shown. The pre-mortared masonry panel 12 includes a plurality of bricks 14 embedded in place with a polymeric material 16. In one example illustrated in FIG. 1A, the brick thickness "A" may be about ½" thick, length "B" may be about 6 inches, and width "C" may be about 2-½ inches. The panel thickness "D" of the panel 12 may be approximately ¾", permitting a thickness "E" of approximately ¼" of insulating polymeric material 16 between the bottom surface of the bricks 14 and the building to which the panel 12 is to be mounted. Approximately one half of the brick dimension is sealed, around all four edges and about its bottom surface. In one embodiment, the panel 12 is a modular user friendly size typically 1'-4" wide, but can be larger thin brick panels ¾" thick×4 ft. wide or wider. In another embodiment, the panels 12 can be cut to lengths up to 24 ft. as illustrated in FIG. 1B and, in yet another embodiment, the panels 12 may be of a variety of patterns and other masonry units as illustrated in FIG. 1C. It should be appreciated that the panels 12 may have any suitable pattern, shape, and length.

Figure 4:
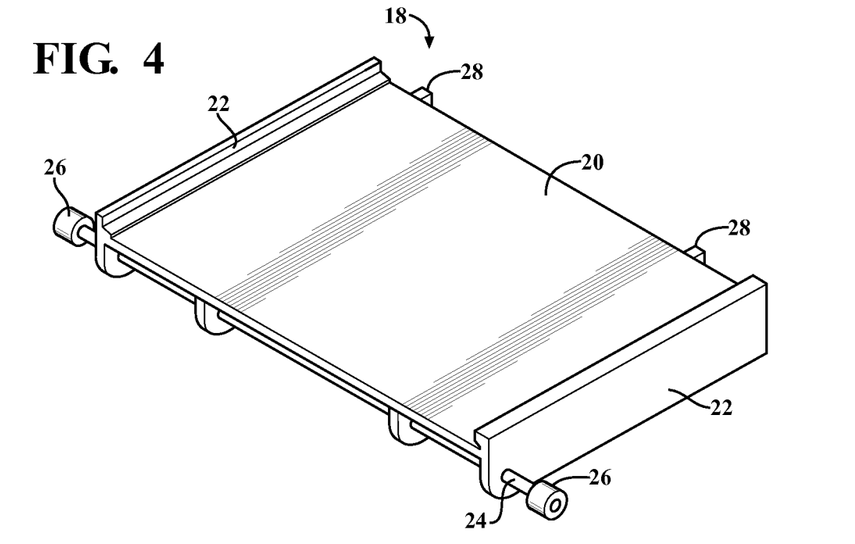
FIG. 4 is a perspective view of a mold of the machine, according to one embodiment of the present invention, of FIGS. 2 and 3.

Referring to FIGS. 2 through 12, in one embodiment, the machine 10 includes a continuous mold, generally indicated at 17. The continuous mold 17 includes a plurality of molds 18 to form the panels 12. In one embodiment, the molds 18 are generally rectangular in shape to form a standard size mold (1'-4" wide×12"). As illustrated in FIG. 4, each mold 18 has a bottom 20 and opposed sides 22 extending from the bottom 20. The top and bottom edges of the mold 18 have a profile to shape a top and bottom lap joint of the panel 12. Each mold 18 includes a rotatable shaft 24 extending through the sides 22 and a roller 26 on each end of the shaft 24. In one embodiment, each mold 18 includes one or more links 28 on either the front or rear end thereof that cooperates with either the rear or front end of an adjacent mold 18 such that the molds 18 are linked together in a continuous manner. In another embodiment, each mold 18 is linked together to an adjacent mold 18 by a suitable mechanism such as fasteners such that the molds 18 are connected together in a continuous manner. Mold release is applied to the casting surfaces on the bottom 20 of the mold 18 to prevent the panels 12 from adhering to the molds 18. It should be appreciated that the molds 18 may have any suitable shape. It should also be appreciated that the shaft 24 is rotatably journaled or supported by the sides 22 of the mold 18.

Figure 5:
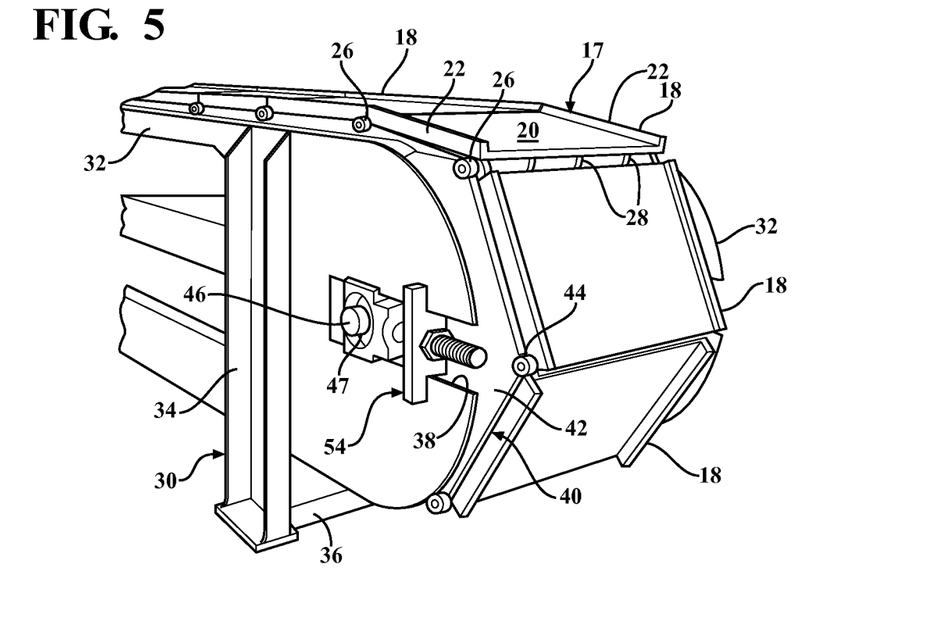
FIG. 5 is a perspective view of an end portion of the machine, according to one embodiment of the present invention, of FIGS. 2 and 3.
Figure 6:
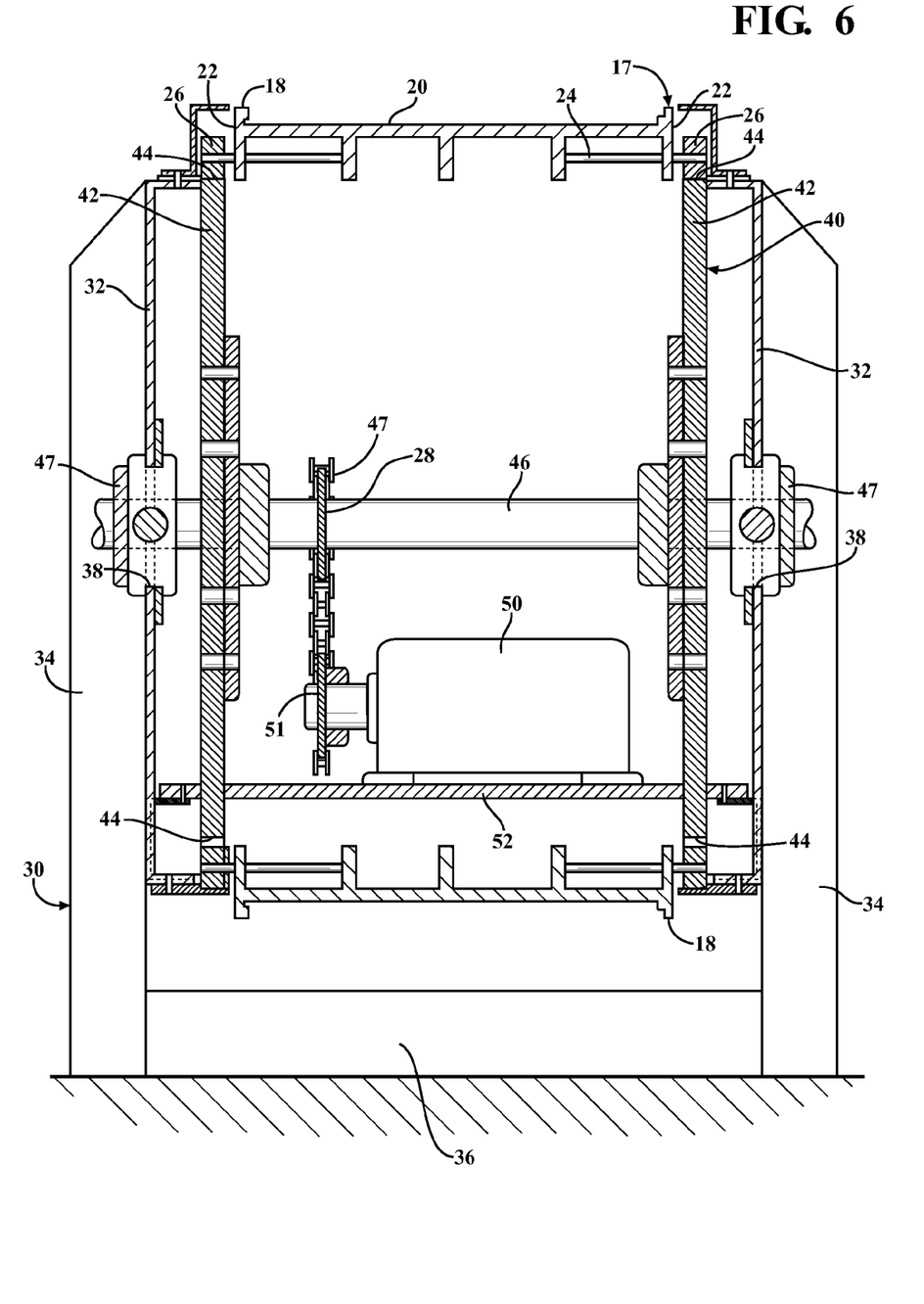
FIG. 6 is a fragmentary view of the end portion of FIG. 5 of the machine, according to one embodiment of the present invention, of FIGS. 2 and 3.
Figure 7:
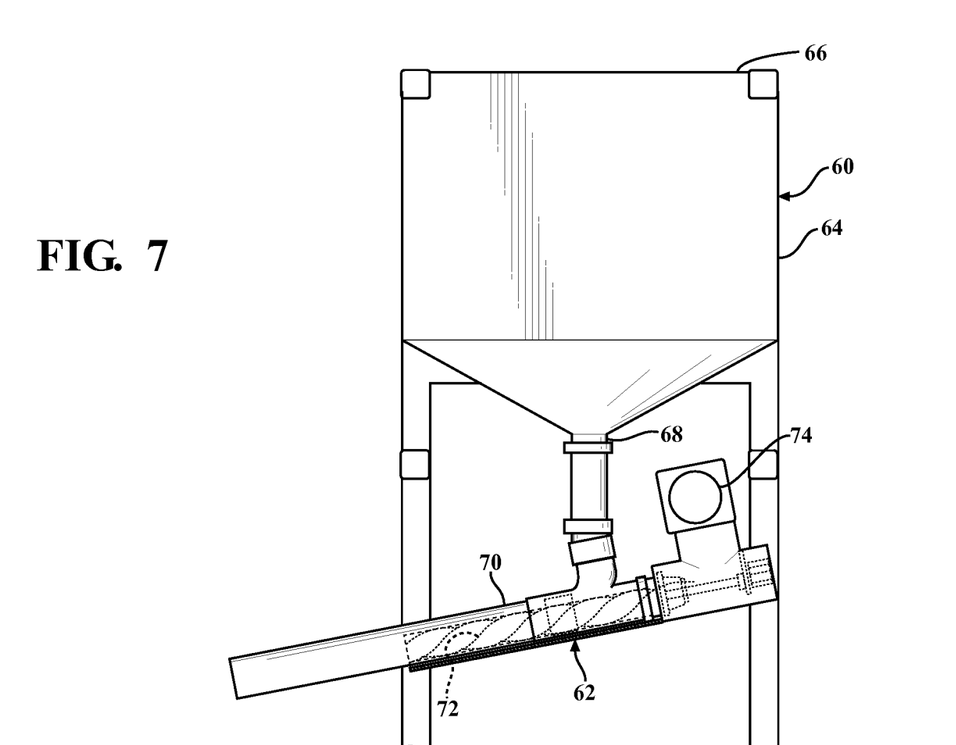
FIG. 7 is a side view of a portion of an application system of the machine, according to one embodiment of the present invention, of FIGS. 2 and 3.

The machine 10 also includes a frame, generally indicated at 30. The frame 30 includes a pair of rails 32 extending longitudinally, a plurality of support members 34 connected to the rails 32 for supporting the rails 32 above a surface such as a floor, and a plurality of cross-members 36 connected between the rails 32 and support members 34. As illustrated in FIG. 5, the rails 32 have a cut-out or slot 38 extending into each end thereof. The rails 32, support members 34, and cross-members 36 are constructed and assembled together in a known manner such as by welding. It should be appreciated that the rollers 26 support the molds 18 on top of the rails 32 for movement therealong.

Referring to FIGS. 2, 3, 5, and 6, the machine 10 includes a drive system, generally indicated at 40, for moving the continuous mold 17 in continuous manner. The drive system 40 includes one or more sprockets 42 rotatably supported by the rails 32. In one embodiment, the sprockets 42 are hexagonal in shape, but may be any suitable shape. The sprockets 42 include a recess 44 at each intersection of the hexagonal sides to receive the shaft 26 of the mold 18 for moving the molds 18. The drive system 40 also includes a rotatable shaft 46 extending through the sprockets 42 and rotatably supported by the rails 32 via bearings 47 disposed in the slots 38 to allow the shaft 46 and sprockets 42 to rotate as a unit. In one embodiment, the drive system 40 includes a chain 47 disposed over a sprocket 48 on the shaft 46 and a motor 50 having a sprocket 51 cooperating with the chain 47 to drive and move the chain 47 and sprockets on each side of the frame 30. In another embodiment, the drive system 40 includes a gear case enclosing gears cooperating with the shaft 46 to provide a 20 to 1 gear reduction and a motor cooperating with the gear case to rotate the gears. The motor 50 is supported by a support member 52 on the frame 30. The motor 50 is of an electrical type and connected to a source of power (not shown). The drive system 40 further includes a tensioner, generally indicated at 54, disposed in the slots 38 of the rails 32 and cooperating with the bearings 47, shaft 46, and sprockets 42 to provide tension to the continuous mold 17. It should be appreciated that the motor 50 may be connected to drive the sprockets 42 in any known manner.

Referring to FIGS. 2, 3, 7, and 8, the machine 10 also includes an application system, generally indicated at 60, for applying the polymeric material 16 to the continuous mold 17. In one embodiment, the application system 60 includes a continuous mixer, generally indicated at 62, for mixing ingredients or materials such as liquid resinous material, filler such as silica sand, aluminum-trioxide, or some other suitable dry filler, catalyst, and/or pigment forming the polymeric material 16. The continuous mixer 62 includes a silo 64 supported by the frame 30. The silo 64 is generally funneled shaped from an upper open end 66 to a lower open end 68 to receive at least one of the mixing materials such as the filler. The continuous mixer 62 also includes a mixing housing 70 such as a mixing tube connected to the silo 64 and a rotatable spiral mixing auger or screw 72 disposed in the housing 70 to mix the mixing materials to form a plastic mixture or polymeric material 16 with the consistency of wet mortar. The continuous mixer 62 includes a motor 74 connected to the rotatable mixing screw 72 by a suitable mechanism such as a chain and sprockets to rotate the mixing screw 72. The motor 74 is of a programmable type to control the speed of rotation of the mixing screw 72. It should be appreciated that the mixing screw 72 mixes the polymeric material 16. It should also be appreciated that the motor 74 is connected to a source of power (not shown).

Figure 8:
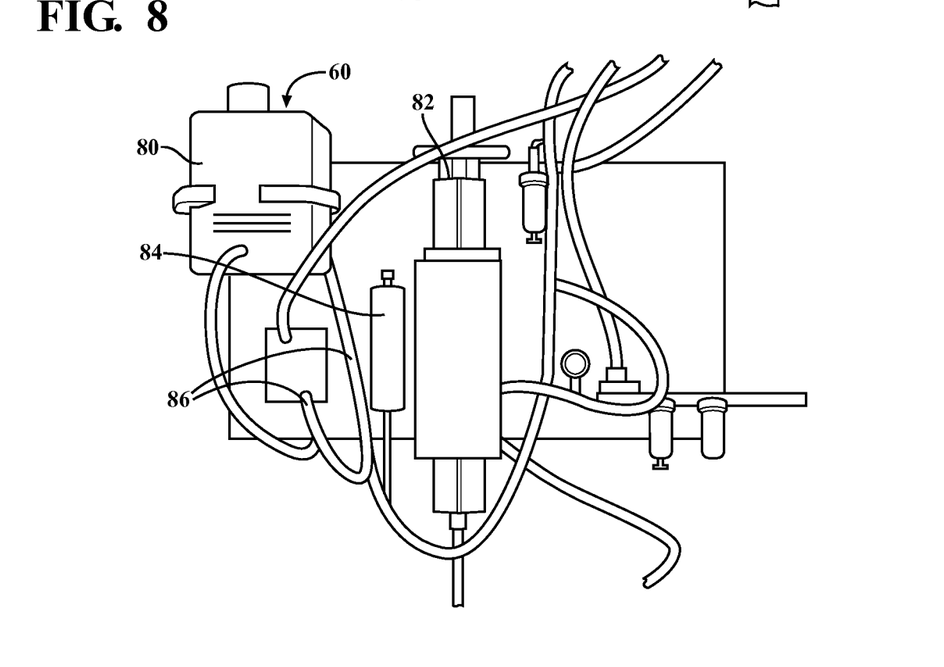
FIG. 8 is side view of another portion of an application system of the machine, according to one embodiment of the present invention, of FIGS. 2 and 3.

As illustrated in FIG. 8, the application system 60 also includes one or more containers 80 for containing the liquid resin, filler, catalyst, and/or pigment. The application system 60 further includes a metering/proportioning pump 82 for metering the liquid resin, filler, catalyst, and/or pigment from the containers 80. In one embodiment, the metering/proportioning pump 82 may be of an air pump type with one or more slave pumps 84 interconnecting the containers 80 and the silo 64 and/or mixing housing 70 via hoses 86. In one embodiment, the liquid resin such as polyester is metered to the mixing housing 70 from the pump 82 and is controlled by regulating the air pressure, thus volume. Another slave pump 84 also operates in tandem with the pump 82 to meter a correct amount of catalyst needed to initiate the resin cure. This is typically 3% by weight of the resin. The amount of catalyst can be increased as needed for a quicker cure. Another slave pump 84 also works in tandem with the pump 82 and meters a controlled amount of liquid pigment to the clear uncolored resin. Then the colored resin enters a two component manifold (not shown) connected to a static mixer (not shown) that adds the catalyst feeding into the mixing housing 70 and the resin and fillers are mixed by the mixing screw 72. Increasing or decreasing the ratio of fillers to resin is also controlled (as described above). In another embodiment, the resin, catalyst and pigment are controlled and powered by three separate programmable motors/metering pumps 82. It should be appreciated that the mixture's viscosity can be varied by increasing or decreasing the amount of liquid resin or adding more filler. It should also be appreciated that the amount of fillers is controlled by programmable motors for speed and volume.

The supply of polymer material 16 is synchronized by controlling the continuous mixer 62 with the speed of the continuous mold 17. A programmable electric motor (not shown) meters a controlled amount of filler to the mixing housing 70 at the lower end 68 of the silo 64 using a metering screw feeder (not shown). The motor 74 drives the mixing screw 72 that extends from the bottom of the metering screw to a spreader 90 to be described. It should be appreciated that the continuous mixer 62 may have programmable logic controls (PLCs) and sensors (not shown) that would also control mold speed, level in the spreader, and the output flow rate independently of its ingredients.

Figure 9:
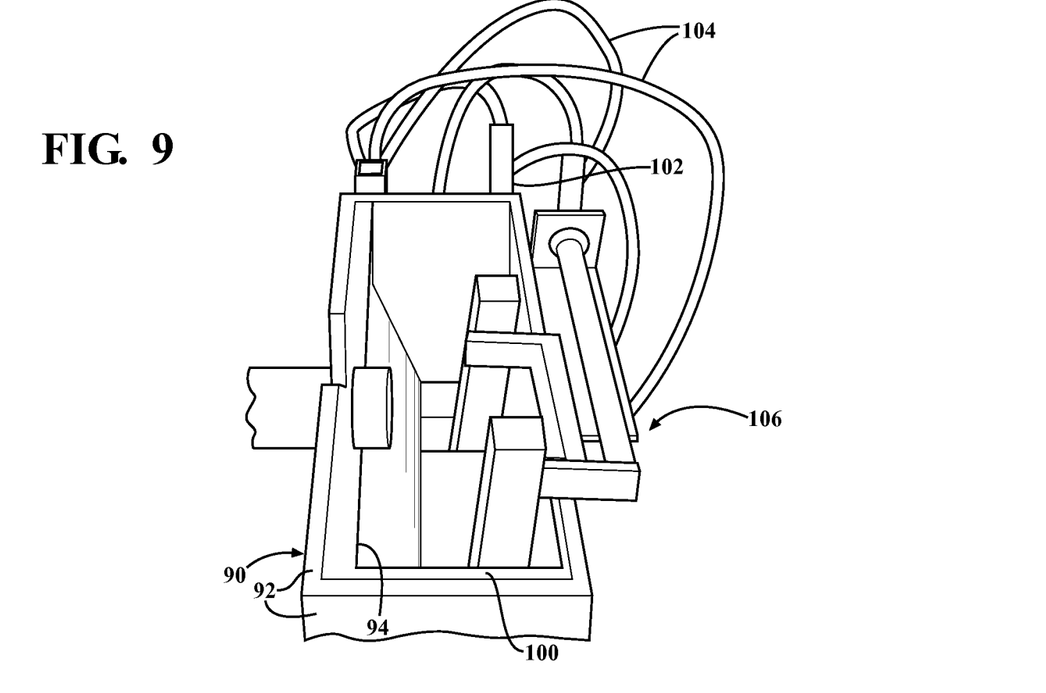
FIG. 9 is a perspective view of yet another portion of an application system of the machine, according to one embodiment of the present invention, of FIGS. 2 and 3.

Referring to FIGS. 2, 3, and 9, the machine 10 also includes a spreader, generally indicated at 90, for spreading the polymeric material 16. The spreader 90 is of an open bottom type and has a generally rectangular shape, although any suitable shape may be used. The spreader 90 has a plurality of sides 92 forming a reservoir 94 and a closed top 96 and open bottom 98. The mixing housing 70 empties into the reservoir 94 of the spreader 90 for filling the continuous mold 17 as it moves past. The spreader 90 may include a liner 100 disposed therein that can be detached for easily cleaning. As the polymeric material 16 empties from the continuous mixer 62, it accumulates against the forward edge of the spreader 90 and is screed to the desired thickness on the continuous mold 17. The forward edge of the spreader 90 is designed to lay a uniform amount on the open faced molds 18. The sides 92 of the spreader 90 have seals (not shown) made of polyurethane that ride on the top edge of the molds 18 and keep the top edge of the moving molds 18 clean of the polymeric material 16. In one embodiment, the spreader 90 lays a controlled amount of polymeric material screened to ½" thickness by setting a gap between the spreader 90 and the molds 18. It should be appreciated that the spreader 90 may include a proximity switch (not shown) that shuts off the machine 10 if the polymeric material 16 extends too high. It should also be appreciated that the spreader 90 may include a site glass (not shown) for visual verification that the polymeric material 16 extends too high.

The machine 10 further includes a vacuum pump 102 connected via hoses 104 to the spreader 90 to create a vacuum to remove air bubbles that may form in the mixing process and maintain uniform porosity of the polymeric material 16. Since the spreader 90 and liner 100 are closed to the atmosphere, the vacuum pump 102 creates a vacuum region therein and removes the bubbles from the polymeric mixture 16. It should be appreciated that, if the vacuum is too high (greater than 30 inches of Hg), there is the possibility that certain resin components of the polymeric material 16 may evaporate. It should also be appreciated that, if the vacuum is too low (less than 10 inches of Hg), there may not be enough vacuum for successfully removing voids from the polymeric material 16. It should further be appreciated that removing air bubbles from the polymeric material 16 improves the strength of the composite.

As illustrated in FIG. 9, the machine 10 may include an agitator 106 to control the flow of polymeric material 16 in the spreader 90 in filling the molds 18 by gravity. The agitator 106 is removably connected to a side of the liner 100 and moves the spreader 90 side to side to achieve a uniform level finish. The agitator 106 constantly moves fresh newly mixed polymeric material 16 and displaces older polymeric material 16 that could build up and harden before exiting the spreader 90.

Referring again to FIGS. 2 and 3, the machine 10 further includes a brick setter system, generally indicated at 108, for placing the bricks 14 on top of the polymeric material in the mold 18 at the desired spacing. In one embodiment, the brick setter system 108 may be a robot or automated brick setter 109 disposed downstream of the spreader 90. In another embodiment, the brick setter system 108 may be a gage or guide supported by the frame 30 downstream of the spreader 90 that can accurately place the bricks 14 manually. The brick setter system 108 places the bricks 14 on top of the polymeric material in the molds 18 and can be visually monitored for quality control. It should be appreciated that the bottom row of bricks is positioned at the bottom of the lower lap joint of the mold 18 with a vertical and horizontal gap between each and the top row is laid ⅜" (one full joint) below the top edge of the mold 18. It should also be appreciated that this spacing configuration helps conceal the horizontal lap joint.

Figure 10:
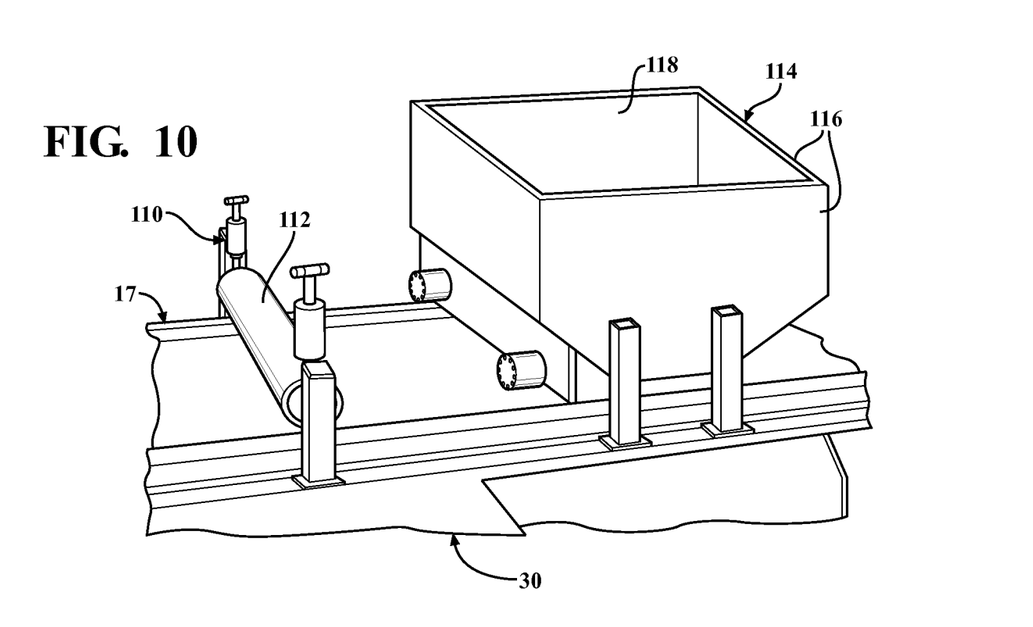
FIG. 10 is a perspective view of a portion of the machine, according to one embodiment of the present invention, of FIGS. 2 and 3.

Referring to FIGS. 2, 3, and 10, the machine 10 may include a brick tapping device, generally indicated at 110, for pressing the bricks 14 deeper into the polymeric material 16. The brick tapping device 110 is disposed downstream either after the brick setter system 108 or a material adding device 114 to be described. The brick tapping device 110 may be a rotatable roller 112 supported by the frame 30 to push the bricks 14 down into the polymeric material 16 if the bricks 14 contact the roller 112. As the bricks 14 sink, the polymeric material 16 between the bricks 14 rises, thus sealing the perimeter of bricks 14. It should be appreciated that sealing around the bricks 14 is important for preventing any water from entering possible voids behind the bricks 14 that may cause freeze damage to the panel 12 but also provides a finished pre-mortared masonry panel 12 that requires no tuck-pointing of joints.

The machine 10 may include a material adding device, generally indicated at 114, for adding material such as filler, for example, sand to the polymeric material 16 in the mold 18. The material adding device 114 is supported by the frame 30 after either the brick setter system 108 or brick tapping device 110 and drops material such as filler onto a top layer of polymeric material 16 in the mold 18. In one embodiment, the material adding device 114 has sides 116 forming a reservoir for the material to be added. In particular, the polymeric material 16 can segregate with the filler going to the bottom, making the top layer less viscous. Thus, the material adding device 114 can add more filler to the polymeric material 16 in the joints between the bricks 14. The material adding device 114 can drop filler in the polymeric material 16 disposed in the mold 18 in the joints between the bricks 14 automatically as needed. The filler added to the joints helps cure the surface of the polymeric material 16 so as to complete the chemical bonding reaction of the top layer of polymeric material 16 in the mold 18. It should be appreciated that the extra filler makes for a thicker joint and has a stronger tensile strength, but also acts to cure the surface that would remain "tacky" and accumulate dirt. It should also be appreciated that the extra filler makes the surface appearance is similar to a tooled cementatious joint.

Figure 11:
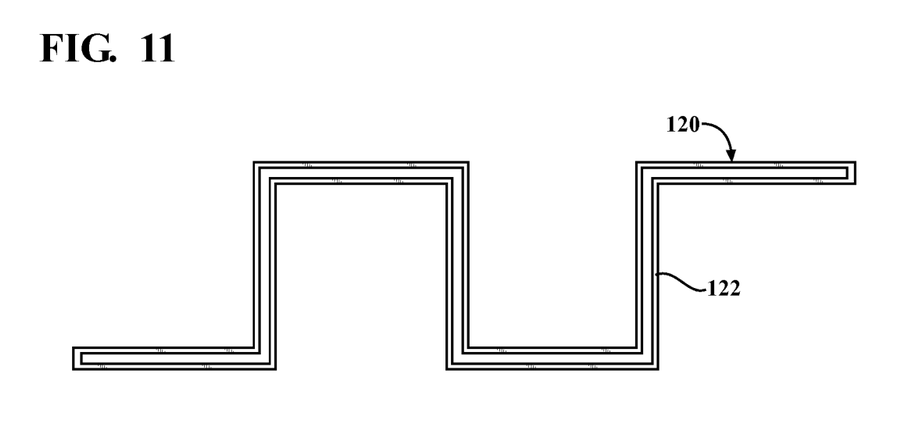
FIG. 11 is a plan view of a cutting device of the machine, according to one embodiment of the present invention, of FIGS. 2 and 3.

Referring to FIGS. 2 and 11, the machine 10 may also include a cutting device, generally indicated at 120, for cutting the panels 12 along the toothed brick lines before the polymeric material 16 hardens betweens the molds 18. In one embodiment, the cutting device 120 is a die 122 having a V shaped profile that is inserted in the joints between the bricks 14 and cuts the uncured polymeric material 16, thus separating one panel 12 in one mold from the panel 12 in the next near mold 18. When the panel 12 is removed from the machine 10, a tapered V shape open joint remains that can later be filled in the field. In another embodiment, the cutting device 120 is an abrasive blasting or water jet. The blasting jet can be made to cut a joint of the desired profile or to cut both the bricks 14 and the polymeric material 16. It should be appreciated that cutting with abrasives or water jets would allow for added reinforcement using fiberglass.

When the polymeric material 16 hardens, the panel 12 is a strong composite able to withstand the rigors of field installation and weathering. Fiberglass reinforcement can be added for additional strength if needed. The panel 12 can be cut to desired lengths suitable to field handling or customer's needs. When installed, the separated panels 12 are bonded together forming a weather tight joint. Screw holes may be formed using cylindrical plugs inserted in the joints between the bricks 14. The plugs are designed to be removed when the polymeric material 16 hardens and leave a countersunk profile for countersunk screws (not shown) for mechanically fastening the panels 12 during installation.

Referring to FIG. 2, the machine 10 may include a heater, generally indicated at 124, to heat either the polymeric material 16 and/or the mold 17. In one embodiment, the heater 124 is supported by the frame 30 to heat the underside of the mold 17. The heater 124 may be a thermostat controlled electric heater to heat the underside of the molds 18. In another embodiment, the heater 124 is supported above the molds 18 to cure the polymeric material 16. The heater 124 may be supported in a tunnel 126 supported by the frame 30. The heater 124 may be disposed either before or after the cutting device 120. It should be appreciated that the polymeric material 16 cures faster by the adding more catalyst or heat to the mix. It should also be appreciated that the heater 124 would cut cure time and allow increased speed and production. It should further be appreciated that another benefit is the significant cost savings from the built-in resin heater, which reduces resin consumption by 2 to 3 percent because of lower viscosity.

Referring to FIG. 3, the machine 10 may be monitored remotely using a programmable logic control (PLC), generally indicated at 128, connected to sensors for the machine 10. Although not shown in detail, the PLC 128 also controls additional functions such as machine speed, robotic brick placement, metering of the filler input, metering of the resin input, metering of the catalyst input, and monitoring of the vacuum magnitude. It should be appreciated that the sensors and controls can be displayed and several machines 10 can be controlled at all times.

In operation of the machine 10, the drive system 40 rotates the continuous mold 17. The application system 60 mixes and applies the polymeric material 16 to the continuous mold 17. As each of the molds 18 is filled with polymeric material 16, the brick setter system 108 sets the bricks 14 upon the polymeric material 16. The bricks 14 may be tapped down by the brick tapping device 110 and additional filler may be added by the material adding device 114 to the polymeric material 16 in the joints between the bricks 14. The heater 124 may heat the molds 18 to faster cure the polymeric material 16 and the cutting device 120 cuts the panels 12 between the molds 18.

Figure 12:
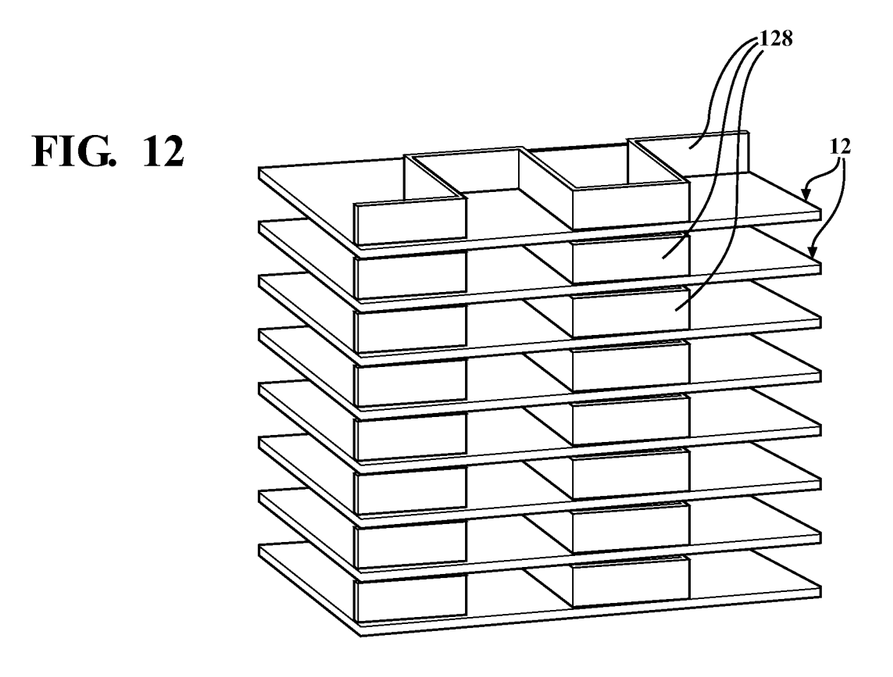
FIG. 12 is a perspective view of a stack of modular pre-mortared masonry panels of FIG. 1 formed by the machine, according to one embodiment of the present invention, of FIGS. 2 and 3.

When the panels 12 harden, they are removed from the molds 18. As illustrated in FIG. 12, the individual panels 12 are stacked with spacers 128 therebetween on pallets (not shown) and ready for shipment. In the field, the panels 12 are in a user friendly size and ready for installation. The panels 12 can be mechanically fastened to any suitable substrate. A typical panel 12 is 8 ft. long×1'-4" high; weighs 70 lb. can be easily handled by installers and screwed to a wall through countersunk holes to the backup wall. Two installers can fasten 50 of these panels 12 on the wall per day. Each 8 ft. panel 12 has 72 bricks (modular bricks are typically ¼", ⅜" or ½" thick×2¼"×7⅝"). The panel workers can thus install 3,600 bricks per day, compared to a "one brick at a time" method of installing only 520 bricks per day of a typical bricklayer with the addition of a laborer to supply mortar and bricks. The panels 12 of the present invention represent a revolution in this ancient industry. The "user friendly" sized pre-mortared masonry panels 12 reduce the cost of very expensive brick masonry.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A machine for continuous casting of pre-mortared masonry panels, said machine comprising:
   a rotatable continuous mold for continuously forming pre-mortared masonry panels;
   an application system for applying polymeric material to said continuous mold as said continuous mold rotates;
   a brick setter system for setting bricks onto the polymeric material as said continuous mold rotates; and
   a cutting device for cutting the bricks and polymeric material into panels to form the pre-mortared masonry panels.

2. A machine as set forth in claim 1 including a drive system to rotate said continuous mold.

3. A machine as set forth in claim 2 wherein said continuous mold comprises a plurality of molds connected together.

4. A machine as set forth in claim 3 wherein each of said molds comprises a bottom wall and side walls extending from said bottom wall.

5. A machine as set forth in claim 3 wherein each of said molds includes a rotatable shaft extending therethrough and a roller at each end of said shaft.

6. A machine as set forth in claim 5 wherein said drive system comprises at least one rotatable sprocket having a plurality of recesses in an outer periphery thereof to receive said shaft of said molds and rotate said continuous mold.

7. A machine as set forth in claim 6 wherein said drive system includes a shaft extending through said at least one rotatable sprocket and a motor operatively cooperating with said shaft to rotate said continuous mold.

8. A machine as set forth in claim 5 including a frame for supporting said continuous mold comprising a pair of rails extending longitudinally and supporting said rollers of said molds.

9. A machine as set forth in claim 1 wherein said application system comprises:
   a continuous mixer including a rotatable screw for mixing components to form the polymeric material, said components to be mixed in said continuous mixer comprising a liquid resin, a filler, and a catalyst;
   one or more containers for containing at least one of said components;
   a metering/proportioning pump coupled between the continuous mixer and one of said one or more containers for metering said at least one of said components from one of the one or more containers to the continuous mixer.

10. A machine as set forth in claim 1 including a spreader for spreading the polymeric material onto said continuous mold.

11. A machine as set forth in claim 10 including an agitator cooperating with said spreader for agitating the polymeric material.

12. A machine as set forth in claim 1 including a brick tapping device for pressing the bricks into the polymeric material.

13. A machine as set forth in claims 1 including a material adding machine to add filler to the polymeric material in joints between the bricks of the pre-mortared masonry panels.

14. A machine as set forth in claim 1 including a heater for heating the polymeric material in said continuous mold.

15. A machine comprising:
   a frame;
   a rotatable continuous mold supported by said frame for continuously forming pre-mortared masonry panels;
   a drive system supported by said frame for continuously rotating said continuous mold;
   an application system supported by said frame for applying polymeric material to said continuous mold as said continuous mold rotates;
   a spreader supported by said frame for spreading the polymeric material onto said continuous mold;
   a brick setter system for setting bricks onto the polymeric material as said continuous mold rotates;
   a brick tapping device supported by said frame for pressing the bricks into the polymeric material;
   a material adding machine supported by said frame to add filler to the polymeric material in joints between the bricks; and
   a cutting device for cutting the bricks and polymeric material into panels to form pre-mortared masonry panels.

16. A machine as set forth in claim 15 including a heater for heating the polymeric material in said continuous mold.

17. A machine as set forth in claim 15 including an agitator cooperating with said spreader for agitating the polymeric material.

18. A machine as set forth in claim 15 wherein said drive system comprises at least one rotatable sprocket, a shaft extending through said at least one rotatable sprocket, and a motor operatively cooperating with said shaft to rotate said continuous mold.

19. A machine as set forth in claim 15 wherein said application system comprises:
   a continuous mixer including a rotatable screw for mixing components to form the polymeric material, said components to be mixed in said continuous mixer comprising a liquid resin, a filler, and a catalyst;
   one or more containers for containing at least one of said components;
   a metering/proportioning pump coupled between the continuous mixer and one of said one or more containers for metering said at least one of said components from one of the one or more containers to the continuous mixer.

20. A machine comprising:
   a frame;
   a rotatable continuous mold comprising a plurality of molds connected together and supported by said frame for continuously forming pre-mortared masonry panels;
   a drive system supported by said frame and comprising at least one rotatable sprocket, a shaft extending through said at least one rotatable sprocket, and a motor operatively cooperating with said shaft for continuously rotating said continuous mold;
   an application system supported by said frame including a continuous mixer for mixing components to form the polymeric material and for applying polymeric material to said molds as said continuous mold rotates;
   a brick setter system for setting bricks onto the polymeric material as said continuous mold rotates; and
   a brick tapping device supported by said frame for pressing the bricks into the polymeric material;
   a material adding machine supported by said frame to add filler to the polymeric material in joints between the bricks; and a cutting device for cutting the bricks and polymeric material into panels to form pre-mortared masonry panels.

* * * * *